United States Patent
Lu

(10) Patent No.: US 11,455,805 B2
(45) Date of Patent: Sep. 27, 2022

(54) METHOD AND APPARATUS FOR DETECTING PARKING SPACE USAGE CONDITION, ELECTRONIC DEVICE, AND STORAGE MEDIUM

(71) Applicant: Hangzhou Hikvision Digital Technology Co., Ltd., Hangzhou (CN)

(72) Inventor: Chao Lu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 29 days.

(21) Appl. No.: 17/057,362

(22) PCT Filed: May 15, 2019

(86) PCT No.: PCT/CN2019/087043
§ 371 (c)(1),
(2) Date: Nov. 20, 2020

(87) PCT Pub. No.: WO2019/223586
PCT Pub. Date: Nov. 28, 2019

(65) Prior Publication Data
US 2021/0192227 A1      Jun. 24, 2021

(30) Foreign Application Priority Data

May 25, 2018   (CN) .......................... 201810517986.8

(51) Int. Cl.
*G06V 20/54*       (2022.01)
*G06T 7/70*        (2017.01)
(Continued)

(52) U.S. Cl.
CPC ............... *G06V 20/54* (2022.01); *G06T 7/70* (2017.01); *G06V 10/225* (2022.01); *G06V 10/44* (2022.01);
(Continued)

(58) Field of Classification Search
CPC ...... G06V 20/54; G06V 10/225; G06V 10/44; G06V 20/625; G06V 10/82; G06V 20/52;
(Continued)

(56) References Cited

U.S. PATENT DOCUMENTS 6,344,806 B1 * 2/2002 Katz ...................... G07B 15/02
705/13
8,625,853 B2 * 1/2014 Carbonell .............. G08G 1/146
382/104
(Continued)

FOREIGN PATENT DOCUMENTS

CN          101656023           2/2010
CN          101750049           6/2010
(Continued)

OTHER PUBLICATIONS

Krasner, Guy "Automatic Parking Identification and Vehicle Guidance with Road Awareness" ISCEE 2016. (Year: 2016).*
(Continued)

*Primary Examiner* — Emily C Terrell
*Assistant Examiner* — Molly Wilburn
(74) *Attorney, Agent, or Firm* — Norton Rose Fulbright US LLP

(57) ABSTRACT

A method and an apparatus for detecting a usage status of a parking space, an electronic device, and a storage medium are disclosed. The method comprises: obtaining a monitored image of a to-be-detected parking space; identifying lane line position information of the to-be-detected parking space from the monitored image; identifying vehicle information from the monitored image, wherein the vehicle information comprises vehicle position information; and determining a usage status of the to-be-detected parking space based on a positional relationship between the lane line position information and the vehicle position information. Determining
(Continued)

the usage status of the to-be-detected parking space based on the positional relationship between the lane line position information and the vehicle information is less affected by external environmental factors, which thus may improve the accuracy of a detection result of the usage status of the parking space.

14 Claims, 7 Drawing Sheets

(51) Int. Cl.
  *G08G 1/017* (2006.01)
  *G06V 10/44* (2022.01)
  *G06V 10/22* (2022.01)
  *G06V 20/62* (2022.01)
(52) U.S. Cl.
  CPC .. *G08G 1/0175* (2013.01); *G06T 2207/30232* (2013.01); *G06V 20/625* (2022.01)
(58) Field of Classification Search
  CPC .......... G06V 30/1448; G06V 30/1801; G06V 30/182; G06V 30/1823; G06V 30/1826; G06V 30/1829; G06V 30/1831; G06V 30/1834; G06V 30/1837; G06T 7/70; G06T 2207/30232; G08G 1/0175; G08G 1/14; G06K 9/6273; G06K 9/00
  See application file for complete search history.

(56) References Cited

U.S. PATENT DOCUMENTS

| | | | | |
|---|---|---|---|---|
| 10,957,198 | B1* | 3/2021 | Hao | G08G 1/14 |
| 2002/0109610 | A1* | 8/2002 | Katz | G07B 15/02 |
| | | | | 340/932.2 |
| 2008/0107304 | A1* | 5/2008 | Coulter | G06V 40/103 |
| | | | | 382/103 |
| 2011/0102197 | A1* | 5/2011 | Herwich | E01F 9/559 |
| | | | | 340/932.2 |
| 2014/0039987 | A1* | 2/2014 | Nerayoff | G07F 17/24 |
| | | | | 348/148 |
| 2017/0203769 | A1* | 7/2017 | Ohta | B60W 50/14 |
| 2019/0291720 | A1* | 9/2019 | Xiao | G01S 13/89 |
| 2019/0370572 | A1* | 12/2019 | Nagpal | G06T 7/62 |
| 2020/0361449 | A1* | 11/2020 | Suzuki | B62D 15/0285 |
| 2021/0020046 | A1* | 1/2021 | Zhou | G08G 1/146 |
| 2021/0114586 | A1* | 4/2021 | Graefe | G08G 1/147 |

FOREIGN PATENT DOCUMENTS

| | | |
|---|---|---|
| CN | 101920679 | 12/2010 |
| CN | 103065519 | 4/2013 |
| CN | 103065520 | 4/2013 |
| CN | 104794931 | 7/2015 |
| CN | 105844959 | 8/2016 |
| CN | 105913685 | 8/2016 |
| CN | 105957395 | 9/2016 |
| CN | 106023595 | 10/2016 |
| CN | 107591018 | 1/2018 |
| CN | 107967817 | 4/2018 |
| JP | 2006301697 | 11/2006 |

OTHER PUBLICATIONS

Extended European Search Report issued in Corresponding European Application No. 19808034.3, dated Jun. 2, 2021.

International Search Report and Written Opinion issued in Corresponding PCT Application No. PCT/CN2019/087043, dated Aug. 20, 2019 (English translation provided).

* cited by examiner

METHOD AND APPARATUS FOR DETECTING PARKING SPACE USAGE CONDITION, ELECTRONIC DEVICE, AND STORAGE MEDIUM

CROSS REFERENCE TO RELATED APPLICATIONS

The present application is a national phase application under 35 U.S.C. § 371 of International Application No. PCT/CN2019/087043, filed May 15, 2019, which claims priority to Chinese Patent Application No. 201810517986.8, filed with the China National Intellectual Property Administration on May 25, 2018, and entitled "METHOD AND APPARATUS FOR DETECTING A USAGE STATUS OF A PARKING SPACE, ELECTRONIC DEVICE, AND STORAGE MEDIUM", each of which are incorporated herein by reference in their entirety.

TECHNICAL FIELD

The present application relates to a technical field of intelligent video image monitoring, and in particular, to a method and an apparatus for detecting a usage status of a parking space, an electronic device, and a storage medium.

BACKGROUND

With the rapid growth of vehicle ownership in our country, the pressure in the management of parking spaces in a parking lot is increasing, and a parking problem caused by the parking spaces in the parking lot has become a hot topic of concern. The effective usage and management of the parking spaces in the parking lot are crucial to the traffic situation of a city and even the development of the city. It is possible to detect the usage status of the parking spaces in the parking lot to perform parking guidance to achieve the effective usage of urban parking spaces.

In relevant methods for detecting usage status of parking spaces, a gray value of an image of a parking space that is unoccupied is obtained in advance. In detecting a usage status of the parking space, a gray value of a current image of the parking space is obtained. If a mean square error between the gray value of the current image and the gray value of the image of the unoccupied parking space is larger than a preset threshold, it is determined that a vehicle is parked in the parking space. If the mean square error between the gray value of the current image and the gray value of the image of the unoccupied parking space is smaller than or equal to the preset threshold, it is determined that the parking space is unoccupied.

However, in the above method of determining whether a vehicle is parked in a parking space by the gray value, environmental changes near the parking space such as light changes or the color of the vehicle similar with the color of the parking space may affect the gray value of the image of the parking space, therefore resulting in the inaccuracy of a detection result of the usage status of the parking space.

SUMMARY

A method and an apparatus for detecting a usage status of a parking space, an electronic device, and a storage medium are provided for improving the accuracy of a detection result of the usage status of the parking space. The specific technique solution is as follows.

In a first aspect, an embodiment of the present application provides a method for detecting a usage status of a parking space, including:
obtaining a monitored image of a to-be-detected parking space; identifying lane line position information of the to-be-detected parking space from the monitored image; identifying vehicle information from the monitored image, wherein the vehicle information includes vehicle position information; and determining a usage status of the to-be-detected parking space based on a positional relationship between the lane line position information and the vehicle position information.

Optionally, determining a usage status of the to-be-detected parking space based on a positional relationship between the lane line position information and the vehicle position information, includes:
if a parking space range indicated by the lane line position information does not intersect with a vehicle range indicated by the vehicle position information, determining that the usage status of the to-be-detected parking space is that no vehicle is parked in the to-be-detected parking space; and if the parking space range indicated by the lane line position information intersects with the vehicle range indicated by the vehicle position information, determining that the usage status of the to-be-detected parking space is that a vehicle is being parked in the to-be-detected parking space.

Optionally, if the parking space range indicated by the lane line position information intersects with the vehicle range indicated by the vehicle position information, determining that the usage status of the to-be-detected parking space is that a vehicle is being parked in the to-be-detected parking space, includes:
if the parking space range indicated by the lane line position information intersects with the vehicle range indicated by the vehicle position information and the vehicle range does not intersect with a lane line indicated by the lane line position information, determining that the usage status of the to-be-detected parking space is that the vehicle is being parked normally in the to-be-detected parking space; and if the parking space range indicated by the lane line position information intersects with the vehicle range indicated by the vehicle position information and the vehicle range intersects with the lane line indicated by the lane line position information, determining that the usage status of the to-be-detected parking space is that the vehicle is being intersection-line parked in the to-be-detected parking space.

Optionally, the vehicle information further includes license plate information; the step of determining a usage status of the to-be-detected parking space based on a positional relationship between the lane line position information and the vehicle position information, includes:
if an intersection between a parking space range indicated by the lane line position information and a vehicle range indicated by the vehicle position information is larger than a preset parking threshold and a vehicle corresponding to the vehicle position information has a license plate, calculating a distance from a center of the license plate to a left parking space line of the to-be-detected parking space based on the lane line position information and the license plate information as a first left-parking-space-line distance, and calculating a distance from the center of the license plate to a right parking space line of the to-be-detected parking space based on the lane line position information and the license plate information as a first right-parking-space-line distance; determining whether the first left-parking-space-line distance, the first right-parking-space-line distance, and a width of the license plate meet a preset intersection-line condition;

if the first left-parking-space-line distance, the first right-parking-space-line distance, and the width of the license plate do not meet the preset intersection-line condition, determining that the usage status of the to-be-detected parking space is that a vehicle is being parked normally in the to-be-detected parking space; and if the first left-parking-space-line distance, the first right-parking-space-line distance, and the width of the license plate meet the preset intersection-line condition, determining that the usage status of the to-be-detected parking space is that a vehicle is being intersection-line parked in the to-be-detected parking space.

Optionally, the vehicle information further includes license plate information; the step of determining a usage status of the to-be-detected parking space based on a positional relationship between the lane line position information and the vehicle position information, includes:

if an intersection between a parking space range indicated by the lane line position information and a vehicle range indicated by the vehicle position information is larger than a preset parking threshold and a vehicle corresponding to the vehicle position information does not have a license plate, determining a simulated center position and a simulated license plate length of a simulated license plate of this vehicle; calculating a distance from the simulated center position to a left parking space line of the to-be-detected parking space as a second left-parking-space-line distance and calculating a distance from the simulated center position to a right parking space line of the to-be-detected parking space as a second right-parking-space-line distance; determining whether the second left-parking-space-line distance, the second right-parking-space-line distance and the simulated license plate length meet a preset intersection-line condition; if the second left-parking-space-line distance, the second right-parking-space-line distance and the simulated license plate length does not meet the preset intersection-line condition, determining that the usage status of the to-be-detected parking space is that a vehicle is being parked normally in the to-be-detected parking space; and if the second left-parking-space-line distance, the second right-parking-space-line distance and the simulated license plate length meets the preset intersection-line condition, determining that the usage status of the to-be-detected parking space is that a vehicle is being intersection-line parked in the to-be-detected parking space.

Optionally, determining whether the first left-parking-space-line distance, the first right-parking-space-line distance, and a width of the license plate meet a preset intersection-line condition, includes:

calculating an absolute value of a difference between the first left-parking-space-line distance and the first right-parking-space-line distance; and if a ratio of the absolute value of the difference to the width of the license plate is larger than a preset intersection-line threshold, determining that the first left-parking-space-line distance, the first right-parking-space-line distance, and the width of the license plate meet the preset intersection-line condition; if the ratio is not larger than the preset intersection-line threshold, determining that the first left-parking-space-line distance, the first right-parking-space-line distance, and the width of the license plate do not meet the preset intersection-line condition.

Optionally, in the method for detecting a usage status of a parking space according to the embodiment of the present application, when the to-be-detected parking space is a single-parking space, the preset intersection-line threshold is an intersection-line threshold for the single-parking space; when the to-be-detected parking space is a left parking space of a dual-parking space, the preset intersection-line threshold is an intersection-line threshold for the left parking space of the dual-parking space; when the to-be-detected parking space is a right parking space of the dual-parking space, the preset intersection-line threshold is an intersection-line threshold for the right parking space of the dual-parking space; when the to-be-detected parking space is a left parking space of a triple-parking space, the preset intersection-line threshold is an intersection-line threshold for the left parking space of the triple-parking space; when the to-be-detected parking space is an intermediate parking space of the triple-parking space, the preset intersection-line threshold is an intersection-line threshold for the intermediate parking space of the triple-parking space; and when the to-be-detected parking space is a right parking space of the triple-parking space, the preset intersection-line threshold is an intersection-line threshold for the right parking space of the triple-parking space.

In a second aspect, an embodiment of the present application provides an apparatus for detecting a usage status of a parking space, including:

an image obtaining module configured for obtaining a monitored image of a to-be-detected parking space; a lane line position determining module configured for identifying lane line position information of the to-be-detected parking space from the monitored image; a vehicle position determining module configured for identifying vehicle information from the monitored image, wherein the vehicle information includes vehicle position information; and a parking space status determining module configured for determining a usage status of the to-be-detected parking space based on a positional relationship between the lane line position information and the vehicle position information.

Optionally, the parking space status determining module includes:

a vehicle-free determining sub-module configured for, if a parking space range indicated by the lane line position information does not intersect with a vehicle range indicated by the vehicle position information, determining that the usage status of the to-be-detected parking space is that no vehicle is parked in the to-be-detected parking space; and a parking determining sub-module configured for, if the parking space range indicated by the lane line position information intersects with the vehicle range indicated by the vehicle position information, determining that the usage status of the to-be-detected parking space is that a vehicle is being parked in the to-be-detected parking space.

Optionally, the parking determining sub-module includes:

a normal determining unit configured for, if the parking space range indicated by the lane line position information intersects with the vehicle range indicated by the vehicle position information and the vehicle range does not intersect with a lane line indicated by the lane line position information, determining that the usage status of the to-be-detected parking space is that the vehicle is being parked normally in the to-be-detected parking space; and an intersection-line determining unit configured for, if the parking space range indicated by the lane line position information intersects with the vehicle range indicated by the vehicle position information and the vehicle range intersects with the lane line indicated by the lane line position information, determining that the usage status of the to-be-detected parking space is that the vehicle is being intersection-line parked in the to-be-detected parking space.

Optionally, the vehicle information further includes license plate information; the parking space status determining module includes:

a first distance calculating sub-module configured for, if an intersection between a parking space range indicated by the lane line position information and a vehicle range indicated by the vehicle position information is larger than a preset parking threshold and a vehicle corresponding to the vehicle position information has a license plate, calculating a distance from a center of the license plate to a left parking space line of the to-be-detected parking space based on the lane line position information and the license plate information as a first left-parking-space-line distance, and calculating a distance from the center of the license plate to a right parking space line of the to-be-detected parking space based on the lane line position information and the license plate information as a first right-parking-space-line distance; a first intersection-line determining sub-module configured for determining whether the first left-parking-space-line distance, the first right-parking-space-line distance, and a width of the license plate meet a preset intersection-line condition; a first normal parking determining sub-module configured for, if the first left-parking-space-line distance, the first right-parking-space-line distance, and the width of the license plate do not meet the preset intersection-line condition, determining that the usage status of the to-be-detected parking space is that a vehicle is being parked normally in the to-be-detected parking space; and a first intersection-line parking determining sub-module configured for, if the first left-parking-space-line distance, the first right-parking-space-line distance, and the width of the license plate meet the preset intersection-line condition, determining that the usage status of the to-be-detected parking space is that a vehicle is being intersection-line parked in the to-be-detected parking space.

Optionally, the vehicle information further includes license plate information; the parking space status determining module includes:

a license plate simulating sub-module configured for, if an intersection between a parking space range indicated by the lane line position information and a vehicle range indicated by the vehicle position information is larger than a preset parking threshold and a vehicle corresponding to the vehicle position information does not have a license plate, determining a simulated center position and a simulated license plate length of a simulated license plate of this vehicle; a second distance calculating sub-module configured for calculating a distance from the simulated center position to a left parking space line of the to-be-detected parking space as a second left-parking-space-line distance and calculating a distance from the simulated center position to a right parking space line of the to-be-detected parking space as a second right-parking-space-line distance; a second intersection-line determining sub-module configured for determining whether the second left-parking-space-line distance, the second right-parking-space-line distance and the simulated license plate length meet a preset intersection-line condition; a second normal parking determining sub-module configured for, if the second left-parking-space-line distance, the second right-parking-space-line distance and the simulated license plate length does not meet the preset intersection-line condition, determining that the usage status of the to-be-detected parking space is that a vehicle is being parked normally in the to-be-detected parking space; and a second intersection-line parking determining sub-module configured for, if the second left-parking-space-line distance, the second right-parking-space-line distance and the simulated license plate length meets the preset intersection-line condition, determining that the usage status of the to-be-detected parking space is that a vehicle is being intersection-line parked in the to-be-detected parking space.

Optionally, the first intersection-line determining sub-module includes:

a difference calculation unit configured for calculating an absolute value of a difference between the first left-parking-space-line distance and the first right-parking-space-line distance; a ratio determining unit configured for, if a ratio of the absolute value of the difference to the width of the license plate is larger than a preset intersection-line threshold, determining that the first left-parking-space-line distance, the first right-parking-space-line distance, and the width of the license plate meet the preset intersection-line condition; if the ratio is not larger than the preset intersection-line threshold, determining that the first left-parking-space-line distance, the first right-parking-space-line distance, and the width of the license plate do not meet the preset intersection-line condition.

Optionally, in the apparatus for detecting a usage status of a parking space according to the embodiment of the present application, when the to-be-detected parking space is a single-parking space, the preset intersection-line threshold is an intersection-line threshold for the single-parking space; when the to-be-detected parking space is a left parking space of a dual-parking space, the preset intersection-line threshold is an intersection-line threshold for the left parking space of the dual-parking space; when the to-be-detected parking space is a right parking space of the dual-parking space, the preset intersection-line threshold is an intersection-line threshold for the right parking space of the dual-parking space; when the to-be-detected parking space is a left parking space of a triple-parking space, the preset intersection-line threshold is an intersection-line threshold for the left parking space of the triple-parking space; when the to-be-detected parking space is an intermediate parking space of the triple-parking space, the preset intersection-line threshold is an intersection-line threshold for the intermediate parking space of the triple-parking space; and when the to-be-detected parking space is a right parking space of the triple-parking space, the preset intersection-line threshold is an intersection-line threshold for the right parking space of the triple-parking space.

In a third aspect, an embodiment of the present application provides an electronic device, which includes a processor and a memory; the memory is configured for storing a computer program; the processor is configured for, when executing the computer program stored on the memory, implementing any one of the methods in the first aspect.

In a fourth aspect, an embodiment of the present application provides a computer-readable storage medium for storing a computer program therein; the computer program, when being executed by a processor, implement any one of the methods in the first aspect.

In a method and an apparatus for detecting a usage status of a parking space, an electronic device, and a storage medium according to embodiments of the present application, a monitored image of a to-be-detected parking space is obtained; lane line position information of the to-be-detected parking space is identified from the monitored image; vehicle information is identified from the monitored image; wherein, the vehicle information includes vehicle position information; the usage status of the to-be-detected parking space is determined based on a positional relationship between the lane line position information and the vehicle position information. Compared with the determination of the usage status of the parking space based on gray value information, determining the usage status of the to-bedetected parking space based on the positional relationship between the lane line position information and the vehicle information is less affected by external environmental factors, which thus may improve the accuracy of a detection result of the usage status of the parking space. Of course, any product or method implementing the present application does not necessarily achieve all the above advantages at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

Figure 1:
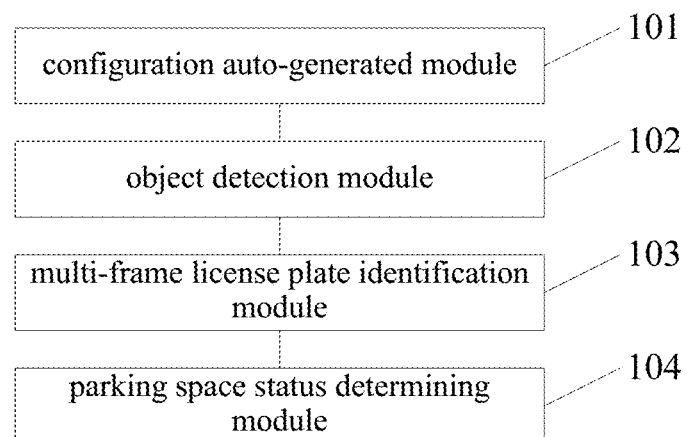
FIG. 1 is a schematic diagram of an apparatus for detecting a usage status of a parking space according to an embodiment of the present application.

In order to make the objectives, technical solutions and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection of the present application.

Before a method for detecting a usage status of a parking space involved in the present application is introduced in detail, the terms, application scenarios and implementation environments involved in the present application are introduced briefly.

First, the terms involved in the present application are introduced.

Image segmentation: it refers to a process of segmenting an image into several image areas with the consistency of characteristics and without overlapping. The positions and ranges of objects of interest are selectively located in the image by image segmentation.

Semantic segmentation: it is different from the image segmentation and classifies each of pixels and provides classifications.

Parking space status: it includes vehicle-free, normal parking, and intersection-line parking (which indicates that a vertical projection of a vehicle in a parking space on the ground intersects with a parking space line of the parking space).

Intersection-line detection: it determines whether a vehicle intersects with a parking space line of a parking space, that is, a vertical projection of the vehicle on the ground intersects with the parking space line, based on a positional relationship between the vehicle in the parking space and the parking line of the parking space.

CNN: Convolutional Neural Network.

Faster RCNN: Faster Regions Convolutional Neural Network, which is an object detection algorithm based on a Convolutional Neural Network (CNN).

RANSAC: it is a line fitting method superior to a least square method. In a case of a determined model and sufficient maximum iterations, the RANSAC can obtain the optimal solution. For a data set containing more than 80% errors, the RANSAC produces a better effect than the least square method.

Deep Learning: it is derived from the research on the Artificial Neural Network (ANN). A deep learning architecture includes Multilayer Perception (MLP) for multi-hidden layers. The deep learning combines lower-layer characteristics to form more abstract higher-layer representation attribute categories and characteristics to find distributed characteristic representation of data.

Second, implementation environments involved in the present application are introduced.

The method for detecting a usage status of a parking space in the present application can be implemented by a terminal, such as an intelligent camera, an intelligent phone, a tablet, a desktop, a hard disk camera, and the like. In case the terminal has an image acquisition function, the terminal generally may be installed at an indoor or outdoor management space for parking spaces, for example, application spaces such as a parking lot, an electronic toll gate, and the like, for capturing an image of a region in which a vehicle is located. Further, in a specific implementation, the terminal may be equipped with a camera to have a shooting function, or the terminal may be connected to an external camera via a data line and implement the shooting function via the connected external camera. This is not limited in the present application.

Third, the application scenarios involved in the present application are introduced.

The present application provides a method for detecting a usage status of a parking space and the method is implemented by an apparatus for detecting a usage status of a parking space. Referring to FIG. 1, the apparatus for detecting a usage status of a parking space includes a configuration auto-generated module 101, an object detection module 102, a multi-frame license plate identification module 103, and a parking space status determining module 104. The apparatus performs the auto-configuration of parking spaces by deep learning-based object segmentation, and eventually implements a function of detecting a status of parking spaces in the parking lot by processes, such as deep learning-based object detection, the analysis of parking space status and the identification of multi-frame license plates.

Figure 2A:
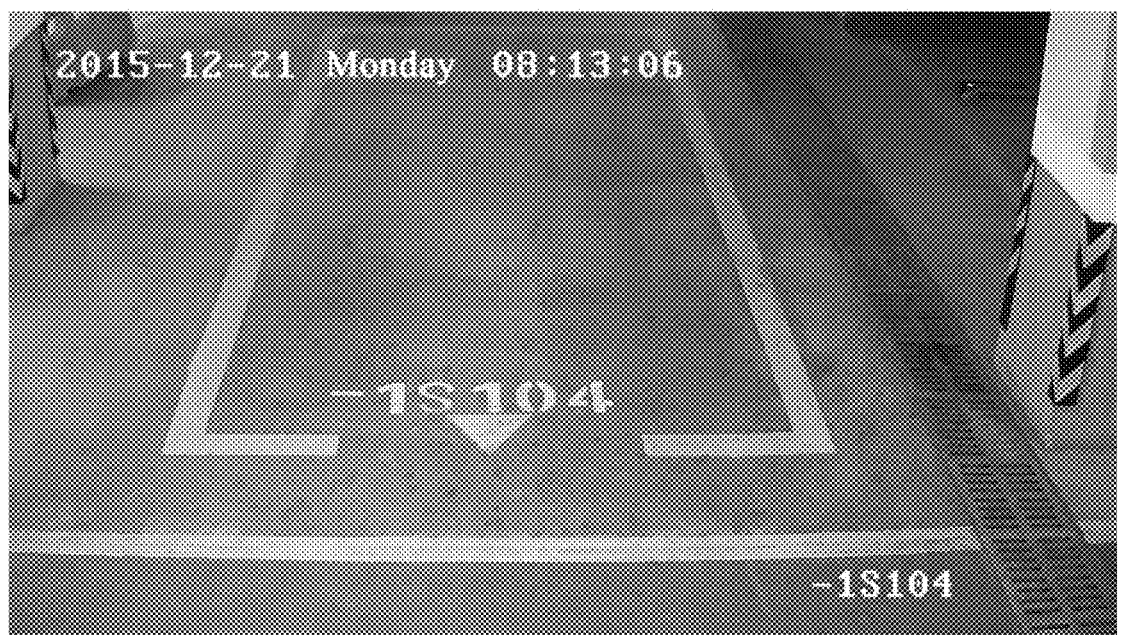
FIG. 2a is a first schematic diagram of an application scenario of a method for detecting a usage status of a parking space according to an embodiment of the present application.
Figure 2B:
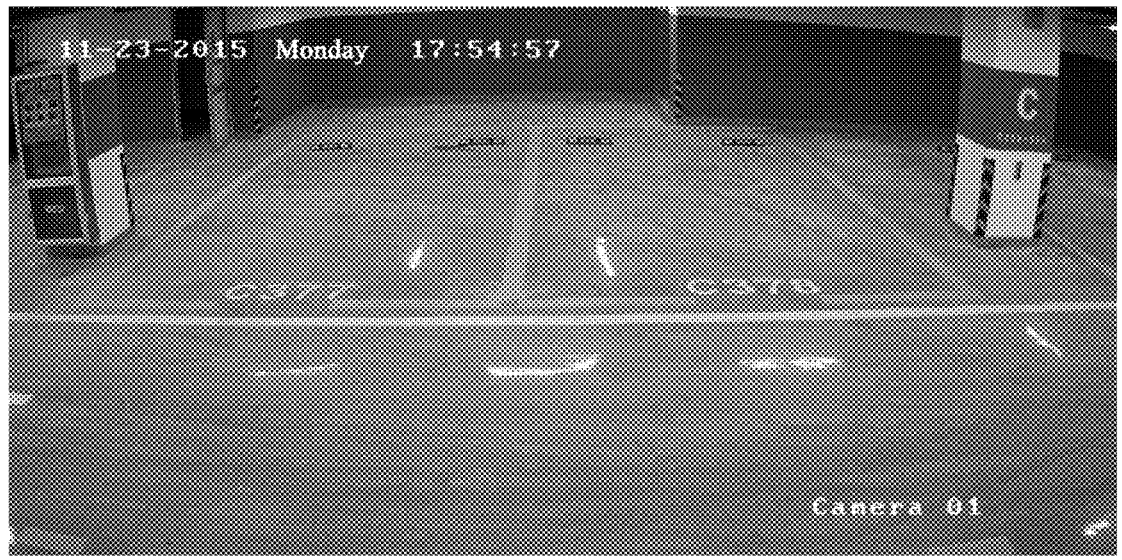
FIG. 2b is a second schematic diagram of an application scenario of a method for detecting a usage status of a parking space according to an embodiment of the present application.
Figure 2C:
FIG. 2c is a third schematic diagram of an application scenario of a method for detecting a usage status of a parking space according to an embodiment of the present application.

Optionally, the method for detecting a usage status of a parking space according to an embodiment of the present application can be used in three arrangements. A scheme for arranging parking spaces of a parking lot is illustrated as FIG. 2a to FIG. 2c, and the scheme is suitable for detecting the parking space status of a 1-parking pace, a 2-parking space and a 3-parking space arranged in the current parking lot at the same time. In a possible implementation, in order to install an image acquisition apparatus, it is required that a parking space stop line is parallel to a bottom edge in a video, a monitored parking space is located in the middle of the video, and the width of a single parking space of a vehicle on an image is between 80 and 1200 pixels.

Figure 3:
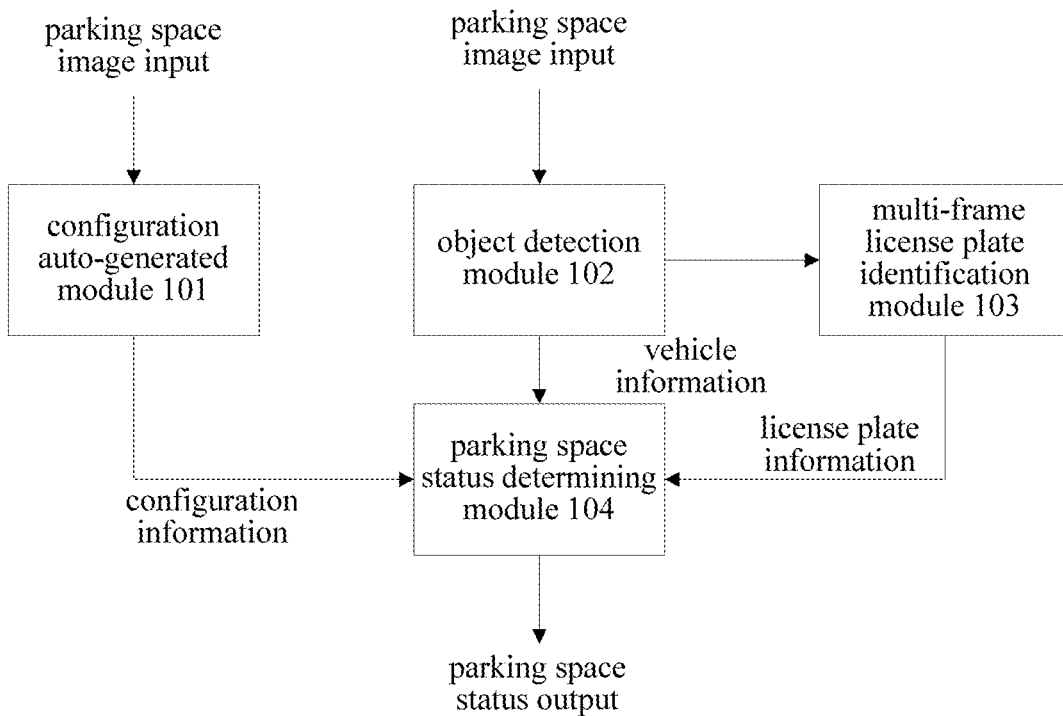
FIG. 3 is a first flow chart of a method for detecting a usage status of a parking space according to an embodiment of the present application.

In the embodiment of the present application, in detecting the usage status of the parking space, parking space configuration information is first automatically generated by the RANSAC fitting algorithm and the object segmentation algorithm; then vehicle position information is detected based on the object detection algorithm, and a current license plate is obtained by performing license plate identification on a vehicle area; and finally, a current parking space status is determined based on parking space classification information and the above information. It mainly includes four steps: 1) extracting, by a configuration auto-generated module 101 based on the deep learning technique and the RANSAC fitting algorithm, lane line information of a parking space to generate a configuration; 2) detecting, by an object detection module 102 based on the deep learning technique, the vehicle in real-time to obtain vehicle position information; 3) performing, by a multi-frame license plate identification module 103, license plate identification to obtain license plate information of individual parking spaces; 4) performing, by a parking space status determining module 104, a logic analysis on the automatically generated configuration information and specific position information of the object and the like, to determine a specific usage status of the parking space. A flow chart of the detection method may be illustrated in FIG. 3.

Figure 4:
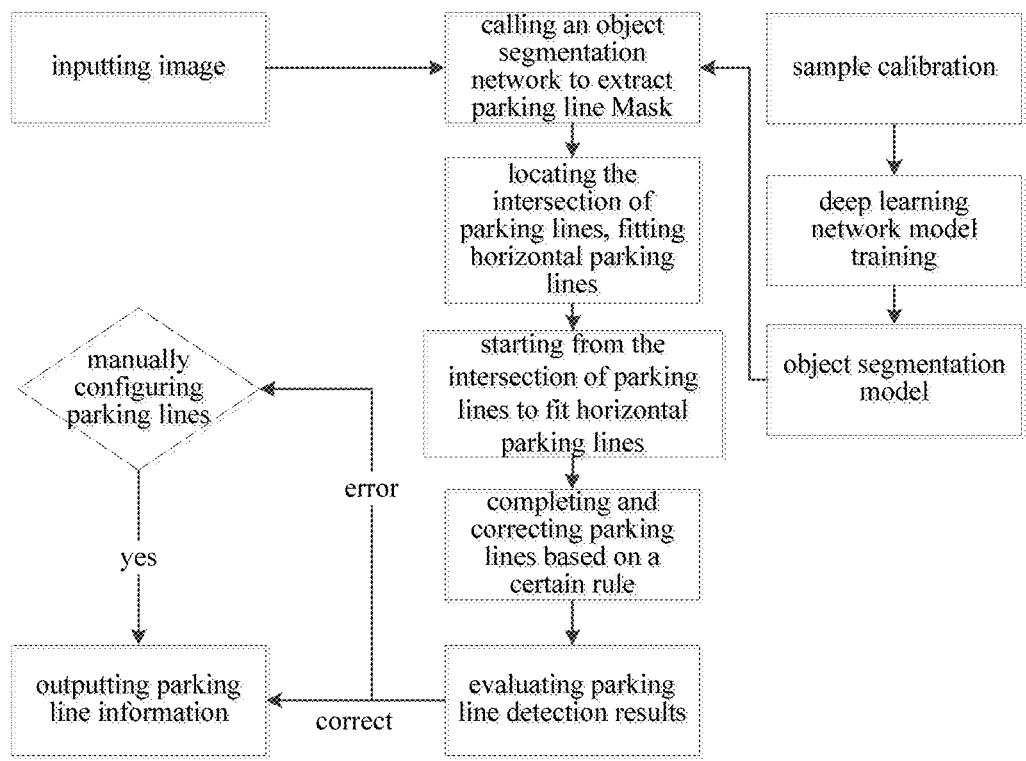
FIG. 4 is a second flow chart of a method for detecting a usage status of a parking space according to an embodiment of the present application.

The configuration information output by the configuration auto-generated module 101 is communicated to the parking space status determining module 104. The configuration auto-generated module 101 mainly performs a parking line area segmentation on an input parking space image, and then performs a post logic extraction process, such as the RANSAC fitting and the like, on the segmentation result to obtain the parking line information, and provide the same to the parking space status determining module 104, whose a specific configuration process is shown in FIG. 4. Mask is a parking line identification result based on Mask RCNN (a convolutional neural network). Optionally, the configuration auto-generated module 101 includes a sample calibration unit, a model training unit, an object segmentation unit and a lane line fitting unit.

The sample calibration unit generates a calibration document based on an object segmentation calibration rule, and performs a sample organization and a sample calibration for organizing hundreds of thousands of picture samples of parking vehicles in underground parking lots with different light intensities, different periods, different arrangements and different scenarios and calibrating four types of objects such as parking lines, pavements, backgrounds, signs in the picture samples.

The model training unit performs post-processing and training on the picture samples calibrated in the sample calibration unit. The model training unit performs hundreds of thousands of iterations by using SegNet (Semantic segmentation deep network) network structure based on Caffe (Convolutional Architecture for Fast Feature Embedding) environment to reach convergence, to obtain object segmentation model.

The object segmentation unit converts a current frame image into RGB (Red Green Blue) format based on the model training unit, transmits it to the object segmentation model, and eventually parses it to obtain the lane line segmentation result of the current frame.

The lane line fitting unit performs morphological erosions and dilations CCL (Connected Component Analysis-Labeling) processing on the object segmentation image output by the object segmentation unit to remove noise areas and performs RANSAC line fitting on the retained parking lines to generate parking space configuration information.

Figure 5:
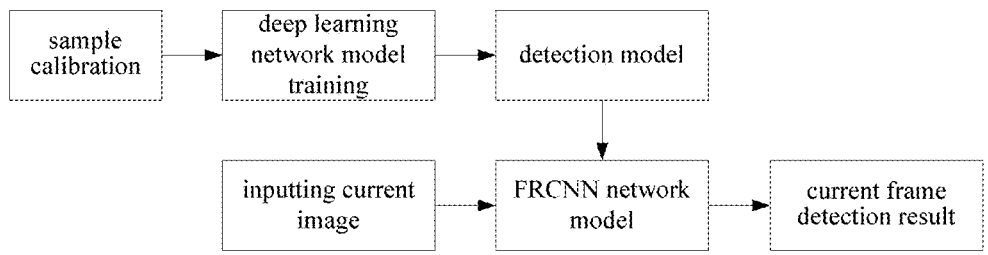
FIG. 5 is a third flow chart of a method for detecting a usage status of a parking space according to an embodiment of the present application.

The object detection module 102 performs a vehicle detection function, and a specific configuration process thereof may be shown as FIG. 5. Optionally, the object detection module 102 includes three components including a sample calibration unit, a model training unit and an object detection unit.

The sample calibration unit is mainly configured for sample organization and sample calibration, to organize hundreds of thousands of picture samples of off-street parking vehicles with different periods, different weathers, different arrangements, and different scenarios and calibrate multiple types of objects such as vehicles (lorries, buses, small cars), pedestrians (pedestrians, bicycles, tricycles), roadblocks in the picture samples.

The model training unit trains picture samples calibrated in the sample calibration unit. In this solution, the model training unit performs hundreds of thousands of iterations by using FRCNN (Faster RCNN) network structure based on Caffe environment, to reach convergence to obtain a detection model.

The object detection unit converts a current frame image into RGB format based on the model training unit and transmits it to the detection model, and eventually parses it to obtain a queue of all the detection objects of the current frame.

The multi-frame license plate identification module 103 mainly performs an object license plate identification function. Optionally, the multi-frame license plate identification module 103 specifically includes a plate identification area generation unit, a license plate identification unit and a multi-frame plate selection unit.

The plate identification area generation unit, after a gun camera informs a dome camera of verification, passes a suspected object position to the dome camera via a gun-to-dome interactive mode. The dome camera performs PTZ (Pan/Title/Zoom) coordinate transformation based on gun and dome calibration information and an object position in the gun camera, to output position information of the object in the field of view of the dome camera. The position information is the plate identification area of the dome camera.

Figure 6:
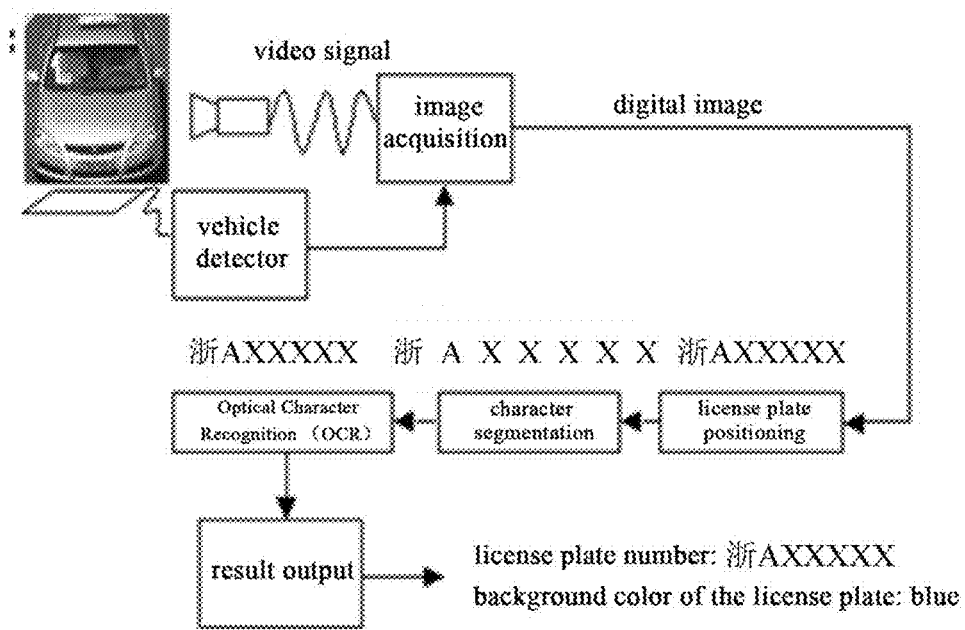
FIG. 6 is a fourth flow chart of a method for detecting a usage status of a parking space according to an embodiment of the present application.

The license plate identification unit mainly performs identification of all the license plates within the plate identification area in a single-frame image. The main flow chart of the identification is shown in FIG. 6, mainly including steps of license plate positioning, character segmentation, and optical character recognition, and so on.

Step 1: license plate positioning. In the plate identification area, the characteristics on the number of hops, the color characteristics, the HOG (Histogram of Oriented Gradient) characteristics and the like are extracted to extract license plate area in the plate identification area;

step 2: searching for left and right edges of each of characters, and segmenting each of the characters in the license plate area for further identification;

step 3: character identification. The size and brightness of segmented characters are normalized and respectively transmitted to a neural network classifier. The neural network classifier places them into a certain class, and then combines character identification results into a character string.

The multi-frame plate selection unit calculates a license plate result output with the highest degree of confidence based on matched license plate results of multiple adjacent frames.

Figure 7:
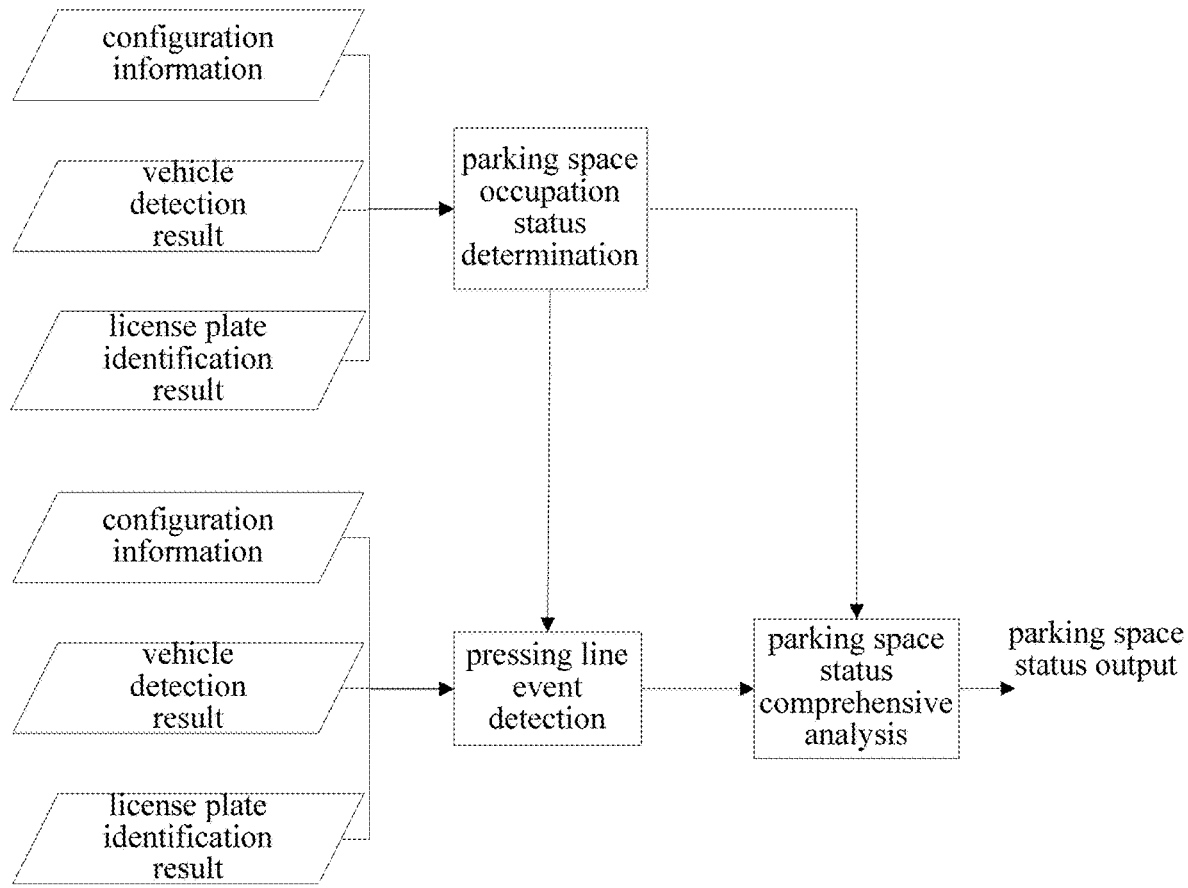
FIG. 7 is a fifth flow chart of a method for detecting a usage status of a parking space according to an embodiment of the present application.

The parking space status determining module 104 is a decision component. The parking space status determining module 104 determines the parking space status by using configuration parameters automatically generated by the configuration auto-generated module 101, object information obtained by the object detection module 102 and license plate information obtained by the multi-frame license plate identification module 103, which is specifically shown in FIG. 7. Optionally, the parking space status determining module 104 includes a parking space occupation status determining unit, an intersection-line event detection unit, and a parking space usage status output unit.

The parking space occupation status determining unit is configured for determining the occupation status of individual parking spaces by the automatically generated configuration information, the vehicle detection result and the license plate identification result. The parking space occupation status is divided into three statuses: vehicle-free, a vehicle with a license plate parking, a vehicle without a license plate parking. The specific steps are as follows:

Step 1: a current parking space is determined by taking a single-parking space as a processing unit; vehicle objects are traversed in a queue of current object detection results; and a vehicle object belonging to the current parking space is calculated based on positional relationships between all vehicle objects and the current parking space; and the same operations are performed on the next parking space in sequence until all of the parking spaces are processed, to match each of parking spaces with each of vehicle objects.

Step 2: a current parking space is determined by taking a single-parking space as a processing unit; multi-frame license plate identification is performed on the current parking space area; and the same operation is performed on the next parking space in sequence until all of the parking spaces are processed, to match each of parking spaces with each of vehicle objects.

Step 3: a single-parking space is taken as a processing unit, and each of the parking spaces has a corresponding vehicle object and license plate information based on the results from step 1 and step 2. If the current parking space does not have a matched vehicle object, a vehicle-free status is output; if the current parking space has a matched vehicle object, but has not a matched license plate object, a status indicating that a vehicle without a license plate is parking is output; and if the current parking space has not only a matched vehicle object but also a matched license plate object, a status indicating that a vehicle with a license plate is parking is output. After the current parking space is processed, and the same operation is performed on the next parking space in sequence until the processing is finished.

The intersection-line event detection unit determines whether there is a vehicle intersection-line event in the current parking space by the automatically generated configuration information, the vehicle detection result, the license plate identification result and the parking space occupation status outputted by the parking space status determining unit. A parking space intersection-line status is divided into two statuses: intersection-line and normal parking. The specific steps are as follows:

Step 1: center positions of license plates and widths of the license plates in individual parking spaces are calculated. A current parking space is determined by taking a single-parking space as a processing unit. If a vehicle with a license plate intersects with a line in the current parking space, the center position of the license plate and the width of the license plate are calculated. If a vehicle without a license plate intersects with a line in the current parking space, a current center position and a width of the license plate are calculated based on a positional relationship between the vehicle and the license plate.

Step 2: distances from the center position of the license plate in the current parking space to a left parking space line and right parking space line of the current parking space are calculated.

Step 3: a threshold for determining whether the current parking space intersects with a line is updated. The threshold is divided into an intersection-line threshold for a single-parking space, an intersection-line threshold for a dual-parking space and an intersection-line threshold for a triple-parking space based on the different number of parking spaces and different parking space locations. The intersection-line threshold for a dual-parking space is divided into an intersection-line threshold for a left parking space and an intersection-line threshold for a right parking space. The intersection-line threshold for a triple-parking space is divided into an intersection-line threshold for a left parking space, an intersection-line threshold for an intermediate parking space, and an intersection-line threshold for a right parking space. The threshold is a template threshold obtained by performing calibration and clustering on a large number of parking spaces.

Step 4: it is determined whether a vehicle is being intersection-line parked in the current parking space. A ratio of the difference between the two distances to the width of the license plate is calculated by the width of the license plate in step 1, the distance from the center position to the left parking space line and the distance from the center position to the right parking space line in step 2, and the intersection-line threshold for the current parking space in step 3; the ratio is compared with the intersection-line threshold; if the ratio is larger than the intersection-line threshold, it is determined that a vehicle intersects with a line, and if the ratio is smaller than or equal to the intersection-line threshold, it is determined that a vehicle is parking normally.

The parking space status output unit output a final parking pace status based on the occupation status outputted by the parking space occupation status determining unit and the intersection-line status outputted by the intersection-line event detection unit. Finally, three statuses: vehicle-free, normal parking, intersection-line parking are outputted and sent to a platform, and the platform may provide corresponding prompts based on different statuses.

The present application brings the following advantageous effects.

(1) The present application achieves a parking space configuration auto-generated algorithm based on the object segmentation. The object segmentation is performed by the SegNet segmentation network based on deep learning, which is stable and efficient, saves the technical staffs support work during arrangement and makes it more convenient and quick.

(2) An object detection is performed by using deep learning theory and using Faster RCNN network model. Compared with the conventional boost algorithm, the SVM (Support Vector Machine) algorithm, gray value algorithm and the like greatly improves object detection rate, reduces false detection rate, and thus greatly improves the accuracy of the detection of the status of parking spaces in a parking lot.

(3) In addition to the determination of whether a parking space is occupied, the present application further determine whether a vehicle intersects with a parking line, which conveniently manage vehicles for obtaining evidence and timely manages behaviors that disturb the normal order.

(4) The method for detecting a usage status of a parking space according to the embodiment of the present application can implement high efficient detection on the parking statuses of a parking lot, which not only can reduce labor costs and maintain traffic order of the parking lot, but also provide real-time reference information to road supervision departments, facilitating management and scheduling, effectively improving the use efficiency of parking spaces in the parking lot, and alleviating the problem of difficult parking in the parking lot.

After application scenarios and implementation environments involved in the present application are introduced, the method for locating a license plate in the present application will be described in detail with reference to the accompanying drawings.

Figure 8:
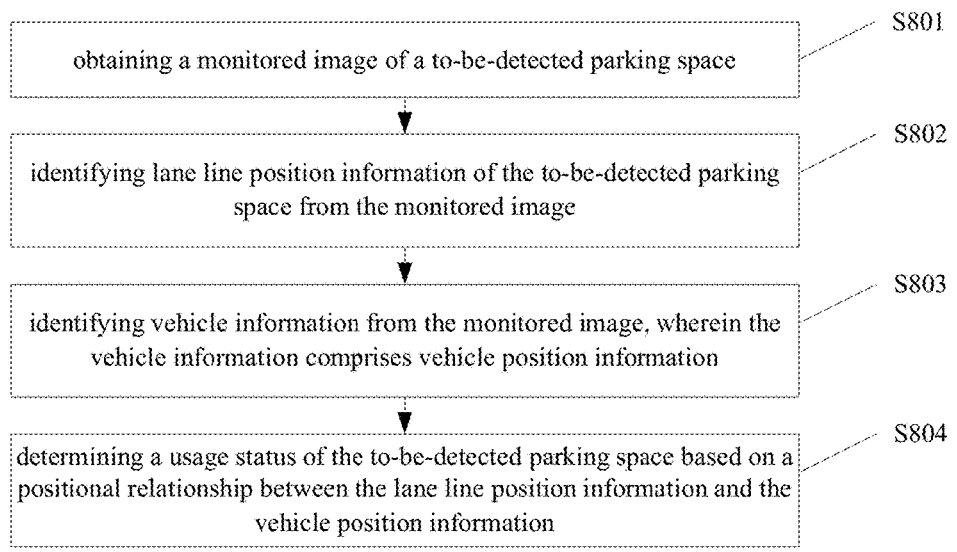
FIG. 8 is a sixth flow chart of a method for detecting a usage status of a parking space according to an embodiment of the present application.

An embodiment of the present application provides a method for detecting a usage status of a parking space. Referring FIG. 8, the method includes the following steps.

At S801, a monitored image of a to-be-detected parking space is obtained.

The method for detecting a usage status of a parking space in the embodiment of the present application can be implemented by a parking space detection system. The parking space detection system is any system that can implement the method for detecting a usage status of a parking space according to the embodiment of the present application.

For example, the parking space detection system may be a device including: a processor, a memory, a communication interface and a bus. The processor, the memory and the communication interface are connected to each other and communicate with each other via the bus. The memory stores executable program codes. The processor executes a program corresponding to the executable program codes by reading the executable program codes stored in the memory for performing the method for detecting a usage status of a parking space according to the embodiment of the present application.

For example, the parking space detection system may be an application program which, when being executed, performs the method for detecting a usage status of a parking space according to the embodiment of the present application.

For example, the parking space detection system may be a storage medium for storing executable codes. The executable codes are configured for implementing the method for detecting a usage status of a parking space according to the embodiment of the present application.

The parking space detection system obtains a monitored image of a to-be-detected parking space via a monitoring device. The to-be-detected parking space may be a parking space in any form such as a single-parking space, a left parking space of a dual-parking space, a right parking space of a dual-parking space, a left parking space of a triple-parking space, an intermediate parking space of a triple-parking space, or a right parking space of a triple-parking space.

At S802, lane line position information of the to-be-detected parking space is identified from the monitored image.

The parking space detection system determines the lane line position information in the monitored image by a preset object identification algorithm. The preset object identification algorithm is any algorithm for identifying a lane line position, such as RCNN (Regions with Convolutional Neural Network Features), DMP (Deformable Parts Model), Faster RCNN or the like.

Optionally, the step of identifying lane line position information of the to-be-detected parking space from the monitored image includes:

analyzing the monitored image by a preset object segmentation model to obtain a lane line segmentation result; performing a noise removal process on the lane line segmentation result, and performing line fitting by an RANSAC (Random Sample Consensus) algorithm to obtain the lane line position information of the to-be-detected parking space.

The parking space detection system performs parking line area segmentation on the monitored image and performs a post logic extraction process such as RANSAC fitting on the segmentation result to obtain the lane line position information.

Optionally, the preset object segmentation model may be obtained by the following steps: developing a calibration document based on an object segmentation calibration rule, guiding a sample organization and a sample calibration for organizing parking image samples of a parking lot with different light intensities, different periods, different arrangements and different scenarios and calibrating four types of objects such as parking lines, pavements, backgrounds, signs in the image samples. A post-processing training is performed on the calibrated image samples. The solution performs iterations by the SegNet network structure based on the Caffe environment to reach convergence to obtain the object segmentation model.

The monitored image is converted into the RGB color format and is inputted to the object segmentation model to obtain the lane line segmentation result. In a possible implementation, morphological erosions and dilations CCL (Connected Component Analysis-Labeling) process is performed on the lane line segmentation result to remove noise areas, and then the RANSAC line fitting is performed on the retained individual parking lines to obtain the lane line position information.

At S803, vehicle information is identified from the monitored image; wherein, the vehicle information includes vehicle position information.

The parking detection system obtains the vehicle information by a preset vehicle identification algorithm. The vehicle information includes vehicle position information.

At S804, the usage status of the to-be-detected parking space is determined based on a positional relationship between the lane line position information and the vehicle position information.

If an intersection of a parking space range indicated by the lane line position information and a vehicle range indicated by the vehicle position information is smaller than a preset range threshold, it is determined that no vehicle is parked in the to-be-detected parking space; if the intersection is not smaller than the preset range threshold, it is determined that a vehicle is being parked in the to-be-detected parking space. The preset range threshold may be set based on actual situations. For example, the preset range threshold may be set as 0, may be set as 5%, 10%, 15%, 20% and the like of the parking pace range indicated by the lane line position information, or may be set as 40%, 50%, 60%, 70% or the like of the vehicle range indicated by the vehicle position information.

In the embodiment of the present application, compared with the determination of the usage status of the parking space based on the gray value information, the determination of the usage status of the to-be-detected parking space based on the positional relationship between the lane line position information and the vehicle information is less affected by external environmental factors, which thus may improve the accuracy of a detecting result of the usage status of the parking space.

In an implementation of the embodiment of the present application, the step of determining the usage status of the to-be-detected parking space based on the positional relationship between the lane line position information and the vehicle position information includes:

step 1: if a parking space range indicated by the lane line position information does not intersect with a vehicle range indicated by the vehicle position information, determining that the usage status of the to-be-detected parking space is that no vehicle is parked in the to-be-detected parking space; and step 2: if the parking space range indicated by the lane line position information intersects with the vehicle range indicated by the vehicle position information, determining that the usage status of the to-be-detected parking space is that a vehicle is being parked in the to-be-detected parking space.

In the implementation of the embodiment of the present application, the vehicle range indicated by the vehicle position information is a size of a vertical projection of a vehicle on the ground. If a parking space range indicated by the lane line position information does not intersect with a vehicle range indicated by the vehicle position information, it means that no vehicle is parked in a parking space corresponding to the lane line position information. If the parking space range indicated by the lane line position information intersects with the vehicle range indicated by the vehicle position information, it means that a vehicle is being parked in the parking space.

Optionally, the step 2 of if the parking space range indicated by the lane line position information intersects with the vehicle range indicated by the vehicle position information, determining that the usage status of the to-be-detected parking space is that a vehicle is being parked in the to-be-detected parking space, includes:

step 1: if the parking space range indicated by the lane line position information intersects with the vehicle range indicated by the vehicle position information and the vehicle range does not intersect with the lane line indicated by the lane line position information, determining the usage status of the to-be-detected parking space is that a vehicle is being parked normally in the to-be-detected parking space; and step 2: if the parking space range indicated by the lane line position information intersects with the vehicle range indicated by the vehicle position information and the vehicle range intersects with the lane line indicated by the lane line position information, determining the usage status of the to-be-detected parking space is that there a vehicle is being intersection-line parked in the to-be-detected parking space.

In the embodiment of the present application, in the status that a vehicle is being parked in the to-be-detected parking space, it can be further determined whether a vehicle is normally parking in the to-be-detected parking space or a vehicle is being intersection-line parked in the to-be-detected parking space, in order to facilitate timely management of behaviors that disturb normal order.

In another implementation of the embodiment of the present application, the vehicle information further includes license plate information.

The parking space detection system obtains the license plate information by a preset license plate identification algorithm; wherein, the license plate information includes the center position of the license plate and the width of the license plate.

For example, the parking space detection system extracts the license plate information via a monitoring device such as a gun camera and a dome camera. After the gun camera informs the dome camera of verification, the gun camera passes a position of a suspected license plate to the dome camera. The dome camera performs PTZ (Pan/Title/Zoom) coordinate transformation on the position of the suspected license plate in the gun camera based on gun and dome calibration information, and then obtains a position of the suspected license plate in the field of view of the dome camera, that is, a license plate identification area of the dome camera.

The characteristics on the number of hops, the color characteristics, the HOG characteristics and the like in the license plate identification area are extracted to extract the license plate area. The left and right edges of each character are determined in the license plate identification area and the license plate identification area is segmented to obtain each character. The sizes of brightness of segmented characters are normalized; and then the characters are classified and identified, respectively; and then the character identification results are combined into a character string. The license plate results for the multiple adjacent video frames are analyzed to select the license plate information with the highest degree of confidence.

Figure 9:
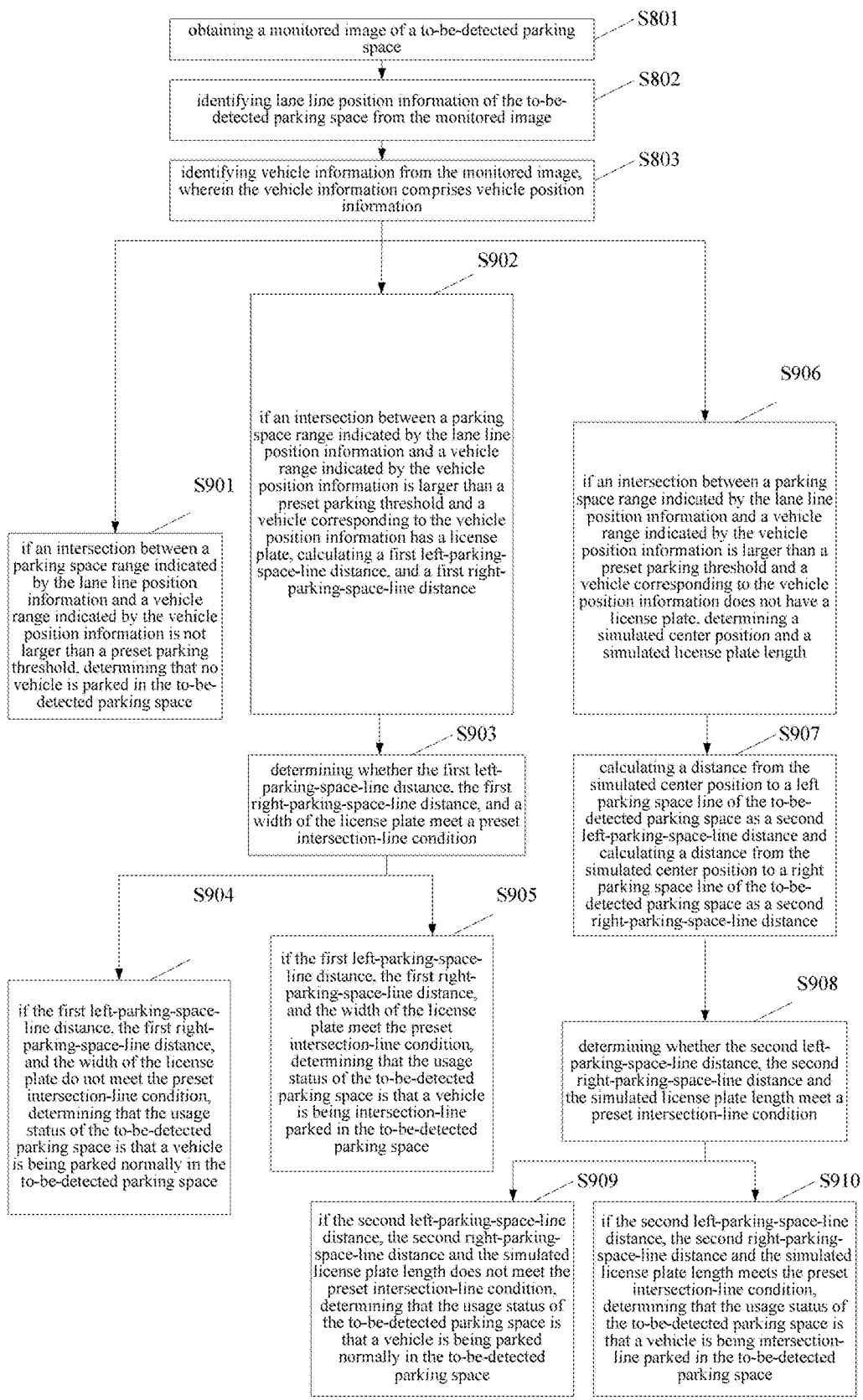
FIG. 9 is a seventh flow chart of a method for detecting a usage status of a parking space according to an embodiment of the present application.

Accordingly, referring to FIG. 9, the step of determining the usage status of the to-be-detected parking space based on the positional relationship between the lane line position information and the vehicle position information includes the following steps.

At S901, if the intersection between a parking space range indicated by the lane line position information and a vehicle range indicated by the vehicle position information is not large than a preset parking threshold, it is determined that no vehicle is parked in the to-be-detected parking space.

In an implementation of the embodiment of the present application, the vehicle range indicated by the vehicle position information may be a range of a vehicle in the monitored image and the parking space range indicated by the lane line position information may be a range of a parking space in the monitored image. The preset parking threshold may be set based on actual conditions. For example, the preset vehicle threshold is set as 5%, 10%, 15%, 20% or the like of the parking space range indicated by the lane line position information, or the preset parking threshold is set as 40%, 50%, 60%, 70% or the like of the vehicle range indicated by the vehicle position information.

At S902, if the intersection between the parking space range indicated by the lane line position information and the vehicle range indicated by the vehicle position information is larger than a preset parking threshold and a vehicle corresponding to the vehicle position information has a license plate, a distance from a center of the license plate to a left parking space line of the to-be-detected parking space based on the lane line position information and the license plate information is calculated as a first left-parking-space-line distance, and a distance from the center of the license plate to a right parking space line of the to-be-detected parking space based on the lane line position information and the license plate information is calculated as a first right-parking-space-line distance.

At S903, it is determined whether the first left-parking-space-line distance, the first right-parking-space-line distance, and a width of the license plate meet a preset intersection-line condition.

Optionally, the step of determining whether the first left-parking-space-line distance, the first right-parking-space-line distance, and a width of the license plate meet a preset intersection-line condition, includes:

step 1: calculating an absolute value of a difference between the first left-parking-space-line distance and the first right-parking-space-line distance;

step 2: if a ratio of the absolute value of the difference to the width of the license plate is larger than a preset intersection-line threshold, determining that the first left-parking-space-line distance, the first right-parking-space-line distance, and the width of the license plate meet the preset intersection-line condition; if the ratio is not larger than the preset intersection-line threshold, determining that the first left-parking-space-line distance, the first right-parking-space-line distance, and the width of the license plate do not meet the preset intersection-line condition.

The preset intersection-line threshold is an empirical value, and is set based on actual conditions. Sample parking spaces may be selected in advance for calibration and clustering. The ratio of the absolute value of the difference between the distances to the width of the license plates is calculated multiple times and then an average of the ratios is calculated as the preset intersection-line threshold. The difference between the distances is a difference between the first left-parking-space-line distance and the first right-parking-space-line distance when a vehicle just intersects with the line.

In the embodiment of the present application, the absolute value of a difference between the first left-parking-space-line distance and the first right-parking-space-line distance is calculated, and the ratio of the absolute value of the difference to the width of the license plate is calculated. When the ratio is larger than the preset intersection-line threshold, it is determined that the preset intersection-line condition is met, which can reduce errors caused by different widths of the vehicles, and improve the determination accuracy.

Optionally, the step of determining whether the first left-parking-space-line distance, the first right-parking-space-line distance, and the width of the license plate meet the preset intersection-line condition includes the following steps 1-3.

At the step 1, a difference between the first left-parking-space-line distance and the first right-parking-space-line distance is calculated.

At the step 2, if a ratio of the difference to the width of the license plate is not in a preset intersection-line range, it is determined that the first left-parking-space-line distance, the first right-parking-space-line distance, and the width of the license plate meet the preset intersection-line condition, and if the difference is a positive value, it is determined that a vehicle intersects with the right parking space line, or if the difference is a negative value, it is determined that a vehicle intersects with the left parking space line.

The preset intersection-line range is an empirical value, and is set based on actual conditions. Sample parking spaces can be selected in advance for calibration and clustering. The ratio of the left difference to the width of the license plate is calculated multiple times and an average of the ratios is calculated as a lower limit of a preset intersection-line range. The ratio of the right difference to the width of the license plate is calculated multiple times and an average of the ratios is calculated as an upper limit of the preset intersection-line range. The left difference is a difference between the first left-parking-space-line distance and the first right-parking-space-line distance when a vehicle just intersects with the left lane line, and the right difference is a difference between the first left-parking-space-line distance and the first right-parking-space-line distance when a vehicle just intersects with the right lane line.

At the step 3: if the ratio of the difference to the width of the license plate is in the preset intersection-line range, it is determined that the first left-parking-space-line distance, the first right-parking-space-line distance, and the width of the license plate do not meet the preset intersection-line condition.

In the embodiment of the present application, in a case of intersection-line parking, it can be determined whether a vehicle intersects with the right parking space line or the left parking space line, in order to facilitate timely management of behaviors that disturb normal order.

At S904, if the first left-parking-space-line distance, the first right-parking-space-line distance, and the width of the license plate do not meet the preset intersection-line condition, it is determined that the usage status of the to-be-detected parking space is that a vehicle is being parked normally in the to-be-detected parking space.

At S905, if the first left-parking-space-line distance, the first right-parking-space-line distance, and the width of the license plate meet the preset intersection-line condition, it is determined that the usage status of the to-be-detected parking space is that a vehicle is being intersection-line parked in the to-be-detected parking space.

The embodiment of the present application provides a method for further determining whether a vehicle is being parked normally in the to-be-detected parking space or being intersection-line parked in the to-be-detected parking space when the vehicle has a license plate, in order to facilitate timely management of behaviors that disturb normal order.

Optionally, the vehicle information further includes license plate information.

Accordingly, referring to FIG. 9, determining the usage status of the to-be-detected parking space based on a positional relationship between the lane line position information and the vehicle position information, includes the following steps.

At S906, if the intersection between the parking space range indicated by the lane line position information and the vehicle range indicated by the vehicle position information is larger than the preset parking threshold and a vehicle corresponding to the vehicle position information does not have a license plate, a simulated center position and a simulated license plate length of a simulated license plate of the vehicle that does not have a license plate are determined.

When a vehicle does not have a license plate, the simulated center position and the simulated license plate length of the simulated license plate of the vehicle that does not have a license plate are determined based on a preset positional relationship between the vehicle and the license plate. In a possible implementation, different types of vehicles that have license plates may be selected in advance, and positions of the license plates in individual vehicles are respectively determined for establishing positional relationships between individual types of vehicles and license plates.

At S907, a distance from the simulated center position to the left parking space line of the to-be-detected parking space is calculated as a second left-parking-space-line distance and a distance from the simulated center position to the right parking space line of the to-be-detected parking space is calculated as a second right-parking-space-line distance.

At S908, it is determined whether the second left-parking-space-line distance, the second right-parking-space-line distance and the simulated license plate length meet the preset intersection-line condition.

The step of determining whether the second left-parking-space-line distance, the second right-parking-space-line distance and the simulated license plate length meet the preset intersection-line condition is the same as or similar to the step of determining whether the first left-parking-space-line distance, the first right-parking-space-line distance and the width of the license plate meet the preset intersection-line condition, which is not repeated here.

At S909, if the second left-parking-space-line distance, the second right-parking-space-line distance and the simulated license plate length does not meet the preset intersection-line condition, it is determined that the usage status of the to-be-detected parking space is that a vehicle is being parked normally in the to-be-detected parking space.

At S910, if the second left-parking-space-line distance, the second right-parking-space-line distance and the simulated license plate length meet the preset intersection-line condition, it is determined that the usage status of the to-be-detected parking space is that a vehicle is being intersection-line parked in the to-be-detected parking space.

The embodiment of the present application provides a method for further determining whether a vehicle is being parked normally in the to-be-detected parking space or being intersection-line parked in the to-be-detected parking space when the vehicle does not have a license plate, in order to facilitate timely management of behaviors that disturb normal order.

Optionally, for different types of parking spaces, when the to-be-detected parking space is a single-parking space, the preset intersection-line threshold is an intersection-line threshold for the single-parking space; when the to-be-detected parking space is a left parking space of a dual-parking space, the preset intersection-line threshold is an intersection-line threshold for the left parking space of the dual-parking space; when the to-be-detected parking space is a right parking space of the dual-parking space, the preset intersection-line threshold is an intersection-line threshold for the right parking space of the dual-parking space; when the to-be-detected parking space is a left parking space of a triple-parking space, the preset intersection-line threshold is an intersection-line threshold for the left parking space of the triple-parking space; when the to-be-detected parking space is an intermediate parking space of the triple-parking space, the preset intersection-line threshold is an intersection-line threshold for the intermediate parking space of the triple-parking space; when the to-be-detected parking space is a right parking space of the triple-parking space, the preset intersection-line threshold is an intersection-line threshold for the right parking space of the triple-parking space.

Different types of parking spaces may have different parking space widths. To more accurately determine whether a vehicle intersects with the line, different thresholds are set for different types of parking spaces. The preset intersection-line thresholds are empirical values. Sample parking spaces can be selected in advance to perform calibration and clustering to obtain intersection-line thresholds for different types of parking spaces.

In the embodiment of the present application, setting different intersection-line thresholds for different types of parking spaces can improve the accuracy of determining whether a vehicle intersects with the line.

Figure 10:
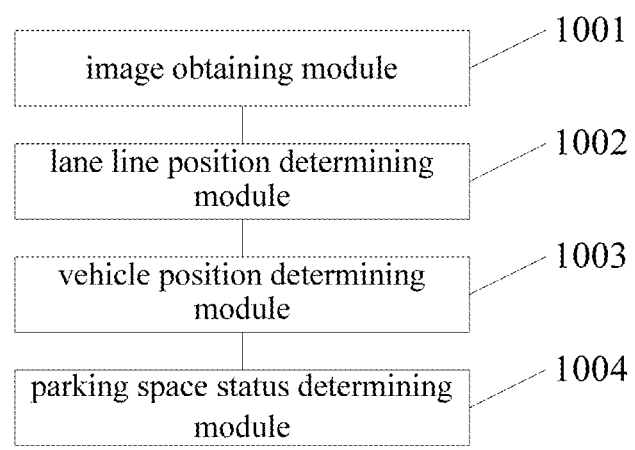
FIG. 10 is another schematic diagram of an apparatus for detecting a usage status of a parking space according to an embodiment of the present application.

An embodiment of the present application further provides an apparatus for detecting a usage status of a parking space. Referring to FIG. 10, the apparatus includes:

an image obtaining module 1001 configured for obtaining a monitored image of a to-be-detected parking space;

a lane line position determining module 1002 configured for identifying lane line position information of the to-be-detected parking space from the monitored image;

a vehicle position determining module 1003 configured for identifying vehicle information from the monitored image, wherein the vehicle information includes vehicle position information; and a parking space status determining module 1004 configured for determining a usage status of the to-be-detected parking space based on a positional relationship between the lane line position information and the vehicle position information.

In the embodiments of the present application, compared with the determination of the usage status of the parking space based on the gray value information, determining the usage status of the to-be-detected parking space based on the positional relationship between the lane line position information and the vehicle information is less affected by external environmental factors, which thus may improve the accuracy of a detection result of the usage status of the parking space.

Optionally, the parking space status determining module 1004 includes:

a vehicle-free determining sub-module configured for, if a parking space range indicated by the lane line position information does not intersect with a vehicle range indicated by the vehicle position information, determining that the usage status of the to-be-detected parking space is that no vehicle is parked in the to-be-detected parking space;

a parking determining sub-module configured for, if the parking space range indicated by the lane line position information intersects with the vehicle range indicated by the vehicle position information, determining that the usage status of the to-be-detected parking space is that a vehicle is being parked in the to-be-detected parking space.

Optionally, the parking determining sub-module includes:

a normal determining unit configured for, if the parking space range indicated by the lane line position information intersects with the vehicle range indicated by the vehicle position information and the vehicle range does not intersect with a lane line indicated by the lane line position information, determining that the usage status of the to-be-detected parking space is that the vehicle is being parked normally in the to-be-detected parking space; and an intersection-line determining unit configured for, if the parking space range indicated by the lane line position information intersects with the vehicle range indicated by the vehicle position information and the vehicle range intersects with the lane line indicated by the lane line position information, determining that the usage status of the to-be-detected parking space is that the vehicle is being intersection-line parked in the to-be-detected parking space.

In the embodiment of the present application, in the status that a vehicle is being parked in the to-be-detected parking space, it can be further determined whether the vehicle is normally parking in the to-be-detected parking space or is intersection-line parked in the to-be-detected parking space, in order to facilitate timely management of behaviors that disturb the normal order.

Optionally, in the apparatus for detecting a usage status of a parking space according to an embodiment of the present application, the vehicle information further includes license plate information.

Accordingly, the parking space status determining module 1004 includes:

a first distance calculating sub-module configured for, if an intersection between a parking space range indicated by the lane line position information and a vehicle range indicated by the vehicle position information is larger than a preset parking threshold and a vehicle corresponding to the vehicle position information has a license plate, calculating a distance from a center of the license plate to a left parking space line of the to-be-detected parking space based on the lane line position information and the license plate information as a first left-parking-space-line distance, and calculating a distance from the center of the license plate to a right parking space line of the to-be-detected parking space based on the lane line position information and the license plate information as a first right-parking-space-line distance;

a first intersection-line determining sub-module configured for determining whether the first left-parking-space-line distance, the first right-parking-space-line distance, and a width of the license plate meet a preset intersection-line condition;

a first normal parking determining sub-module configured for, if the first left-parking-space-line distance, the first right-parking-space-line distance, and the width of the license plate do not meet the preset intersection-line condition, determining that the usage status of the to-be-detected parking space is that a vehicle is being parked normally in the to-be-detected parking space; and a first intersection-line parking determining sub-module configured for, if the first left-parking-space-line distance, the first right-parking-space-line distance, and the width of the license plate meet the preset intersection-line condition, determining that the usage status of the to-be-detected parking space is that a vehicle is being intersection-line parked in the to-be-detected parking space.

The embodiment of the present application provides a method for further determining whether a vehicle is being parked normally in the parking space or being intersection-line parked in the to-be-detected parking space when the vehicle has a license plate, in order to facilitate timely management of behaviors that disturb the normal order.

Optionally, in the apparatus for detecting a usage status of a parking space according to an embodiment of the present application, the vehicle information further includes license plate information.

Accordingly, the parking space status determining module 1004 includes:

a license plate simulating sub-module configured for, if an intersection between a parking space range indicated by the lane line position information and a vehicle range indicated by the vehicle position information is larger than a preset parking threshold and a vehicle corresponding to the vehicle position information does not have a license plate, determining a simulated center position and a simulated license plate length of a simulated license plate of this vehicle;

a second distance calculating sub-module configured for calculating a distance from the simulated center position to a left parking space line of the to-be-detected parking space as a second left-parking-space-line distance and calculating a distance from the simulated center position to a right parking space line of the to-be-detected parking space as a second right-parking-space-line distance;

a second intersection-line determining sub-module configured for determining whether the second left-parking-space-line distance, the second right-parking-space-line distance and the simulated license plate length meet a preset intersection-line condition;

a second normal parking determining sub-module configured for, if the second left-parking-space-line distance, the second right-parking-space-line distance and the simulated license plate length does not meet the preset intersection-line condition, determining that the usage status of the to-be-detected parking space is that a vehicle is being parked normally in the to-be-detected parking space; and a second intersection-line parking determining sub-module configured for, if the second left-parking-space-line distance, the second right-parking-space-line distance and the simulated license plate length meets the preset intersection-line condition, determining that the usage status of the to-be-detected parking space is that a vehicle is being intersection-line parked in the to-be-detected parking space.

The embodiment of the present application provides a method for further determining whether a vehicle is being parked normally in the to-be-detected parking space or being intersection-line parked in the to-be-detected parking space when the vehicle does not have a license plate, in order to facilitate timely management of behaviors that disturb the normal order.

Optionally, the first intersection-line determining sub-module includes:

a difference calculation unit configured for calculating an absolute value of a difference between the first left-parking-space-line distance and the first right-parking-space-line distance; and a ratio determining unit configured for, if a ratio of the absolute value of the difference to the width of the license plate is larger than a preset intersection-line threshold, determining that the first left-parking-space-line distance, the first right-parking-space-line distance, and the width of the license plate meet the preset intersection-line condition; if the ratio is not larger than the preset intersection-line threshold, determining that the first left-parking-space-line distance, the first right-parking-space-line distance, and the width of the license plate do not meet the preset intersection-line condition.

In the embodiment of the present application, the absolute value of the difference between the first left-parking-space-line distance and the first right-parking-space-line distance is calculated, and the ratio of the absolute value of the difference to the width of the license plate is calculated. If the ratio is larger than the preset intersection-line threshold, it is determined that the preset intersection-line condition is met. In this way, errors caused by different widths of the vehicles can be reduced, and the determination accuracy can be improved.

Optionally, in the apparatus for detecting a usage status of a parking space according to an embodiment of the present application, when the to-be-detected parking space is a single-parking space, the preset intersection-line threshold is an intersection-line threshold for the single-parking space; when the to-be-detected parking space is a left parking space of a dual-parking space, the preset intersection-line threshold is an intersection-line threshold for the left parking space of the dual-parking space; when the to-be-detected parking space is a right parking space of the dual-parking space, the preset intersection-line threshold is an intersection-line threshold for the right parking space of the dual-parking space; when the to-be-detected parking space is a left parking space of a triple-parking space, the preset intersection-line threshold is an intersection-line threshold for the left parking space of the triple-parking space; when the to-be-detected parking space is an intermediate parking space of the triple-parking space, the preset intersection-line threshold is an intersection-line threshold for the intermediate parking space of the triple-parking space; and when the to-be-detected parking space is a right parking space of the triple-parking space, the preset intersection-line threshold is an intersection-line threshold for the right parking space of the triple-parking space.

In the embodiment of the present application, setting different intersection-line thresholds for different types of parking spaces can improve the accuracy of determining whether a vehicle intersects with the line.

In the apparatus for detecting a usage status of a parking space according to an embodiment of the present application, the image obtaining module 1001 and the lane line position determining module 1002 may be included in the configuration auto-generated module 101 in FIG. 1; the vehicle position determining module 1003 may be understood as the object detection module 102 and the multi-frame license plate identification module 103 in FIG. 1; and the parking space status determining module 1004 may be understood as the parking space status determining module 104 in FIG. 1.

Figure 11:
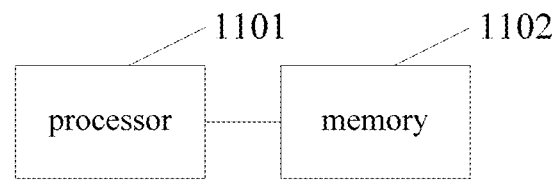
FIG. 11 is a schematic diagram of an electronic device according to an embodiment of the present application.

An embodiment of the present application further provides an electronic device, as shown in FIG. 11, including: a processor 1101 and a memory 1102. The memory 1102 stores a computer program. The processor 1101, when executing the computer program stored in the memory 1102, performs the steps of:

obtaining a monitored image of a to-be-detected parking space;

identifying lane line position information of the to-be-detected parking space from the monitored image;

identifying vehicle information from the monitored image, wherein the vehicle information includes vehicle position information; and determining a usage status of the to-be-detected parking space based on a positional relationship between the lane line position information and the vehicle position information.

In the embodiments of the present application, compared with the determination of the usage status of the parking space based on the gray value information, determining the usage status of the to-be-detected parking space based on the positional relationship between the lane line position information and the vehicle information is less affected by external environmental factors, which thus may improve the accuracy of a detection result of the usage status of the parking space.

Optionally, the processor 1101 can further perform any one of the methods for detecting a usage status of a parking space when executing the computer program stored on the memory 1102.

Optionally, the electronic device further includes: a communication interface and a communication bus; the processor 1101, the communication interface and the memory 1102 communicate with each other via the communication bus.

The communication bus in the electronic device may be a Peripheral Component Interconnect (PCI) bus, an Extended Industry Standard Architecture (EISA) bus or the like. The communication bus may be divided into an address bus, a data bus, a control bus, and the like. For ease of representation, the communication bus is represented only by a thick line, but it does not mean that there is only one bus or one type of bus.

The communication interface is configured for communication between the electronic device and other devices.

The memory may include a Random Access Memory (RAM), or may include Non-Volatile Memory (NVM), such as at least one disk memory. Optionally, the memory may also be at least one storage apparatus located away from the processor.

The processor may be a general-purpose processor, including a Central Processing Unit (CPU), a Network Processor (NP), and the like; it may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

An embodiment of the present application further provides a computer-readable storage medium for storing a computer program therein; the computer program is executed by a processor, so as to cause the processor to perform the steps of:

obtaining a monitored image of a to-be-detected parking space;

identifying lane line position information of the to-be-detected parking space from the monitored image;

identifying vehicle information from the monitored image, wherein the vehicle information includes vehicle position information; and determining a usage status of the to-be-detected parking space based on a positional relationship between the lane line position information and the vehicle position information.

In the embodiments of the present application, compared with the determination of the usage status of the parking space based on the gray value information, determining the usage status of the to-be-detected parking space based on the positional relationship between the lane line position information and the vehicle information is less affected by external environmental factors, which thus may improve the accuracy of a detection result of the usage status of the parking space.

Optionally, the computer program can further, when being executed by a processor, implement any one of the methods for detecting a usage status of a parking space.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the electronic device, and the storage medium are described briefly, since they are basically similar to the embodiments of the method. The related contents can refer to the description of the embodiments of the method.

The above described embodiments are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for detecting a usage status of a parking space, comprising:
    obtaining a monitored image of a to-be-detected parking space;
    identifying lane line position information of the to-be-detected parking space from the monitored image;
    identifying vehicle information from the monitored image, wherein the vehicle information comprises vehicle position information; and
    determining a usage status of the to-be-detected parking space based on a positional relationship between the lane line position information and the vehicle position information,
    wherein, the vehicle information further comprises license plate information;
    the step of determining a usage status of the to-be-detected parking space based on a positional relationship between the lane line position information and the vehicle position information, comprises:
    if an intersection between a parking space range indicated by the lane line position information and a vehicle range indicated by the vehicle position information is larger than a preset parking threshold and a vehicle corresponding to the vehicle position information has a license plate, calculating a distance from a center of the license plate to a left parking space line of the to-be-detected parking space based on the lane line position information and the license plate information as a first left-parking-space-line distance, and calculating a distance from the center of the license plate to a right parking space line of the to-be-detected parking space based on the lane line position information and the license plate information as a first right-parking-space-line distance;
    determining whether the first left-parking-space-line distance, the first right-parking-space-line distance, and a width of the license plate meet a preset intersection-line condition;
    if the first left-parking-space-line distance, the first right-parking-space-line distance, and the width of the license plate do not meet the preset intersection-line condition, determining that the usage status of the to-be-detected parking space is that a vehicle is being parked normally in the to-be-detected parking space; and
    if the first left-parking-space-line distance, the first right-parking-space-line distance, and the width of the license plate meet the preset intersection-line condition, determining that the usage status of the to-be-detected parking space is that a vehicle is being intersection-line parked in the to-be-detected parking space.

2. The method of claim 1, wherein, determining a usage status of the to-be-detected parking space based on a positional relationship between the lane line position information and the vehicle position information, comprises:
    if a parking space range indicated by the lane line position information does not intersect with a vehicle range indicated by the vehicle position information, determining that the usage status of the to-be-detected parking space is that no vehicle is parked in the to-be-detected parking space; and
    if the parking space range indicated by the lane line position information intersects with the vehicle range indicated by the vehicle position information, determining that the usage status of the to-be-detected parking space is that a vehicle is being parked in the to-be-detected parking space.

3. The method of claim 2, wherein, if the parking space range indicated by the lane line position information intersects with the vehicle range indicated by the vehicle position information, determining that the usage status of the to-be-detected parking space is that a vehicle is being parked in the to-be-detected parking space, comprises:
    if the parking space range indicated by the lane line position information intersects with the vehicle range indicated by the vehicle position information and the vehicle range does not intersect with a lane line indicated by the lane line position information, determining that the usage status of the to-be-detected parking space is that the vehicle is being parked normally in the to-be-detected parking space; and
    if the parking space range indicated by the lane line position information intersects with the vehicle range indicated by the vehicle position information and the vehicle range intersects with the lane line indicated by the lane line position information, determining that the usage status of the to-be-detected parking space is that the vehicle is being intersection-line parked in the to-be-detected parking space.

4. The method of claim 1, wherein, the vehicle information further comprises license plate information;
    the step of determining a usage status of the to-be-detected parking space based on a positional relationship between the lane line position information and the vehicle position information, comprises:
    if an intersection between a parking space range indicated by the lane line position information and a vehicle range indicated by the vehicle position information is larger than a preset parking threshold and a vehicle corresponding to the vehicle position information does not have a license plate, determining a simulated center position and a simulated license plate length of a simulated license plate of this vehicle;
    calculating a distance from the simulated center position to a left parking space line of the to-be-detected parking space as a second left-parking-space-line distance and calculating a distance from the simulated center position to a right parking space line of the to-be-detected parking space as a second right-parking-space-line distance;

determining whether the second left-parking-space-line distance, the second right-parking-space-line distance and the simulated license plate length meet a preset intersection-line condition;

if the second left-parking-space-line distance, the second right-parking-space-line distance and the simulated license plate length does not meet the preset intersection-line condition, determining that the usage status of the to-be-detected parking space is that a vehicle is being parked normally in the to-be-detected parking space; and if the second left-parking-space-line distance, the second right-parking-space-line distance and the simulated license plate length meets the preset intersection-line condition, determining that the usage status of the to-be-detected parking space is that a vehicle is being intersection-line parked in the to-be-detected parking space.

5. The method of claim 1, wherein, determining whether the first left-parking-space-line distance, the first right-parking-space-line distance, and a width of the license plate meet a preset intersection-line condition, comprises:

calculating an absolute value of a difference between the first left-parking-space-line distance and the first right-parking-space-line distance; and if a ratio of the absolute value of the difference to the width of the license plate is larger than a preset intersection-line threshold, determining that the first left-parking-space-line distance, the first right-parking-space-line distance, and the width of the license plate meet the preset intersection-line condition; if the ratio is not larger than the preset intersection-line threshold, determining that the first left-parking-space-line distance, the first right-parking-space-line distance, and the width of the license plate do not meet the preset intersection-line condition.

6. The method of claim 5, wherein, when the to-be-detected parking space is a single-parking space, the preset intersection-line threshold is an intersection-line threshold for the single-parking space; when the to-be-detected parking space is a left parking space of a dual-parking space, the preset intersection-line threshold is an intersection-line threshold for the left parking space of the dual-parking space; when the to-be-detected parking space is a right parking space of the dual-parking space, the preset intersection-line threshold is an intersection-line threshold for the right parking space of the dual-parking space; when the to-be-detected parking space is a left parking space of a triple-parking space, the preset intersection-line threshold is an intersection-line threshold for the left parking space of the triple-parking space; when the to-be-detected parking space is an intermediate parking space of the triple-parking space, the preset intersection-line threshold is an intersection-line threshold for the intermediate parking space of the triple-parking space; and when the to-be-detected parking space is a right parking space of the triple-parking space, the preset intersection-line threshold is an intersection-line threshold for the right parking space of the triple-parking space.

7. An apparatus for detecting a usage status of a parking space, comprising:

an image obtaining module configured for obtaining a monitored image of a to-be-detected parking space;

a lane line position determining module configured for identifying lane line position information of the to-be-detected parking space from the monitored image;

a vehicle position determining module configured for identifying vehicle information from the monitored image, wherein the vehicle information comprises vehicle position information; and a parking space status determining module configured for determining a usage status of the to-be-detected parking space based on a positional relationship between the lane line position information and the vehicle position information, wherein, the vehicle information further comprises license plate information;

the parking space status determining module comprises:

a first distance calculating sub-module configured for, if an intersection between a parking space range indicated by the lane line position information and a vehicle range indicated by the vehicle position information is larger than a preset parking threshold and a vehicle corresponding to the vehicle position information has a license plate, calculating a distance from a center of the license plate to a left parking space line of the to-be-detected parking space based on the lane line position information and the license plate information as a first left-parking-space-line distance, and calculating a distance from the center of the license plate to a right parking space line of the to-be-detected parking space based on the lane line position information and the license plate information as a first right-parking-space-line distance;

a first intersection-line determining sub-module configured for determining whether the first left-parking-space-line distance, the first right-parking-space-line distance, and a width of the license plate meet a preset intersection-line condition;

a first normal parking determining sub-module configured for, if the first left-parking-space-line distance, the first right-parking-space-line distance, and the width of the license plate do not meet the preset intersection-line condition, determining that the usage status of the to-be-detected parking space is that a vehicle is being parked normally in the to-be-detected parking space; and a first intersection-line parking determining sub-module configured for, if the first left-parking-space-line distance, the first right-parking-space-line distance, and the width of the license plate meet the preset intersection-line condition, determining that the usage status of the to-be-detected parking space is that a vehicle is being intersection-line parked in the to-be-detected parking space.

8. The apparatus of claim 7, wherein, the parking space status determining module comprises:

a vehicle-free determining sub-module configured for, if a parking space range indicated by the lane line position information does not intersect with a vehicle range indicated by the vehicle position information, determining that the usage status of the to-be-detected parking space is that no vehicle is parked in the to-be-detected parking space; and a parking determining sub-module configured for, if the parking space range indicated by the lane line position information intersects with the vehicle range indicated by the vehicle position information, determining that the usage status of the to-be-detected parking space is that a vehicle is being parked in the to-be-detected parking space.

9. The apparatus of claim 8, wherein, the parking determining sub-module comprises:
a normal determining unit configured for, if the parking space range indicated by the lane line position information intersects with the vehicle range indicated by the vehicle position information and the vehicle range does not intersect with a lane line indicated by the lane line position information, determining that the usage status of the to-be-detected parking space is that the vehicle is being parked normally in the to-be-detected parking space; and
an intersection-line determining unit configured for, if the parking space range indicated by the lane line position information intersects with the vehicle range indicated by the vehicle position information and the vehicle range intersects with the lane line indicated by the lane line position information, determining that the usage status of the to-be-detected parking space is that the vehicle is being intersection-line parked in the to-be-detected parking space.

10. The apparatus of claim 7, wherein, the vehicle information further comprises license plate information;
the parking space status determining module comprises:
a license plate simulating sub-module configured for, if an intersection between a parking space range indicated by the lane line position information and a vehicle range indicated by the vehicle position information is larger than a preset parking threshold and a vehicle corresponding to the vehicle position information does not have a license plate, determining a simulated center position and a simulated license plate length of a simulated license plate of this vehicle;
a second distance calculating sub-module configured for calculating a distance from the simulated center position to a left parking space line of the to-be-detected parking space as a second left-parking-space-line distance and calculating a distance from the simulated center position to a right parking space line of the to-be-detected parking space as a second right-parking-space-line distance;
a second intersection-line determining sub-module configured for determining whether the second left-parking-space-line distance, the second right-parking-space-line distance and the simulated license plate length meet a preset intersection-line condition;
a second normal parking determining sub-module configured for, if the second left-parking-space-line distance, the second right-parking-space-line distance and the simulated license plate length does not meet the preset intersection-line condition, determining that the usage status of the to-be-detected parking space is that a vehicle is being parked normally in the to-be-detected parking space; and
a second intersection-line parking determining sub-module configured for, if the second left-parking-space-line distance, the second right-parking-space-line distance and the simulated license plate length meets the preset intersection-line condition, determining that the usage status of the to-be-detected parking space is that a vehicle is being intersection-line parked in the to-be-detected parking space.

11. The apparatus of claim 7, wherein, the first intersection-line determining sub-module comprises:
a difference calculation unit configured for calculating an absolute value of a difference between the first left-parking-space-line distance and the first right-parking-space-line distance;
a ratio determining unit configured for, if a ratio of the absolute value of the difference to the width of the license plate is larger than a preset intersection-line threshold, determining that the first left-parking-space-line distance, the first right-parking-space-line distance, and the width of the license plate meet the preset intersection-line condition; if the ratio is not larger than the preset intersection-line threshold, determining that the first left-parking-space-line distance, the first right-parking-space-line distance, and the width of the license plate do not meet the preset intersection-line condition.

12. The apparatus of claim 11, wherein, when the to-be-detected parking space is a single-parking space, the preset intersection-line threshold is an intersection-line threshold for the single-parking space; when the to-be-detected parking space is a left parking space of a dual-parking space, the preset intersection-line threshold is an intersection-line threshold for the left parking space of the dual-parking space; when the to-be-detected parking space is a right parking space of the dual-parking space, the preset intersection-line threshold is an intersection-line threshold for the right parking space of the dual-parking space; when the to-be-detected parking space is a left parking space of a triple-parking space, the preset intersection-line threshold is an intersection-line threshold for the left parking space of the triple-parking space; when the to-be-detected parking space is an intermediate parking space of the triple-parking space, the preset intersection-line threshold is an intersection-line threshold for the intermediate parking space of the triple-parking space; and when the to-be-detected parking space is a right parking space of the triple-parking space, the preset intersection-line threshold is an intersection-line threshold for the right parking space of the triple-parking space.

13. An electronic device, comprising a processor and a memory; wherein, the memory is configured for storing a computer program; the processor is configured for, when executing the computer program stored in the memory, implementing the method of claim 1.

14. A non-transitory computer-readable storage medium in which a computer program is stored, wherein, the computer program is executed by a processor, so as to cause the processor to implement the method of claim 1.

* * * * *